E. B. MESSNER.
NUT LOCK.
APPLICATION FILED OCT. 22, 1913.
1,108,866.
Patented Aug. 25, 1914.
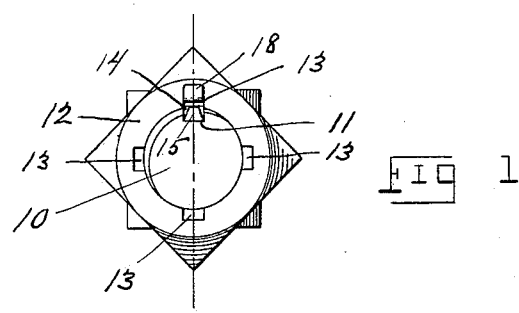
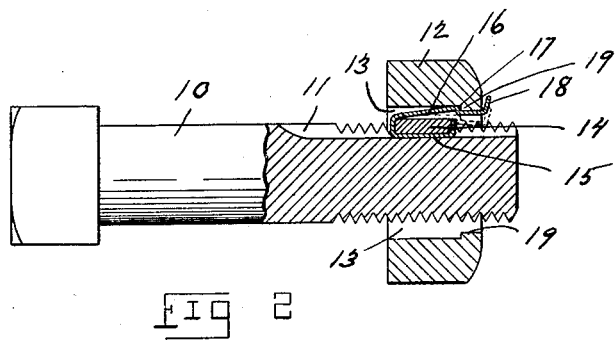
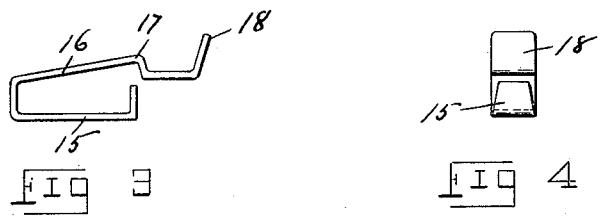
WITNESSES
INVENTOR
Eneas B. Messner,
BY
ATTORNEY

UNITED STATES PATENT OFFICE.

ENEAS B. MESSNER, OF BOWMANSVILLE, PENNSYLVANIA.

NUT-LOCK.

1,108,866.  Specification of Letters Patent.  Patented Aug. 25, 1914.

Application filed October 22, 1913. Serial No. 796,692.

*To all whom it may concern:*

Be it known that I, ENEAS B. MESSNER, a citizen of the United States, residing at Bowmansville, in the county of Lancaster and State of Pennsylvania, have invented certain new and useful Improvements in Nut-Locks, of which the following is a specification, reference being had therein to the accompanying drawing.

This invention relates to nut-locks, such as are employed in securing the nuts from loosening on bolts such as are used in railroad rails, but the invention is capable of many adaptations.

The object in the invention is to provide a device that shall be positive in its actions, and that does not require any special tools to apply or remove.

With these and other objects in view, my invention consists in certain constructions and combinations of parts as will hereinafter be fully described and claimed in the annexed specification, and illustrated in the accompanying drawings, which form a part of this application, and in which like figures of reference refer to corresponding parts in all of the views; but it is fully understood that while I have here described my invention as shown, that I do not confine myself to the exact design, as slight changes may be made in the construction and arrangement of the several parts without departing from the spirit of the invention.

In the drawings: Figure 1, is an end view of a bolt and nut showing my device as applied thereto. Fig. 2, is a side elevation of the same, partly in section. Fig. 3, is an enlarged detail view of the locking spring. Fig. 4, is an end view of the same.

Referring to the drawings, a bolt 10, of usual form is shown, which is provided with a longitudinal key-way 11, extending from the end of the bolt inwardly through the threaded portion of said bolt. The usual nut 12, is provided with one or more key-ways 13, designed to register with the key-way 11, of the bolt when the nut is in proper position; and for this reason it is better to have a number of key-ways 13, in the nuts 12, so that one of them will register with the key-way 11, of the bolt upon a slight turn of said nut 12, upon the bolt 10.

When any one of the key-ways 13, registers with the key-way 11, the nuts 12, may be locked from movement by inserting into the alined key-ways a key 14; said key 14, being contained in a spring locking cage 15, which comprises a strip of flat spring metal bent to form a cage 15, for the key 14, and having a resilient lever 16, formed with an engaging shoulder 17, and a finger-grip end 18. The key-ways 13, in the nut 12, are not of the same depth for this entire length, and a shoulder 19, is thus formed against which the shoulder 17, abuts when the lever 16, springs upward after being inserted from the end of the bolt. The finger-grip 18, is provided so that by a downward pressure thereon as shown in the dotted lines in Fig. 2, the shoulder 17, the cage and key may be easily removed.

Having thus described my invention what I claim as new, and desire to secure by Letters Patent is:—

1. In a nut-lock of the class described, the combination with a bolt provided with a longitudinal key-way, and a nut provided with one or more key-ways adapted to register with the key-way in the bolt, of a shoulder formed in the key-ways of the nut near the outer ends thereof, a key contained in said alined key-ways, and a cage for containing said key, said cage adapted to be inserted into said alined key-ways and means for retaining the same therein from accidental displacement.

2. In a nut-lock of the class described, the combination with a bolt provided with a longitudinal key-way, and a nut provided with a series of key-ways, each of which is formed with a shoulder near the outer end thereof, of a key adapted to enter said key-ways when the same are in an alined position, a cage for containing said key, a resilient lever formed on said cage having a bent end adapted to engage the shoulder of the key-way in the nut for preventing the accidental displacement of said cage and key.

In testimony whereof I affix my signature in presence of two witnesses.

ENEAS B. MESSNER.

Witnesses:
 JOHN J. THOMPSON,
 WM. J. COULTER.

---

Copies of this patent may be obtained for five cents each, by addressing the "Commissioner of Patents, Washington, D. C."